United States Patent [19]

Le Salver et al.

[11] Patent Number: 4,813,513
[45] Date of Patent: Mar. 21, 1989

[54] SUSPENSION DEVICE FOR THE BODY AND THE POWER UNIT OF A MOTOR VEHICLE

[75] Inventors: Robert Le Salver, Andresy; Dominique Poupard, Chaville, both of France

[73] Assignees: Automobiles Peugeot, Paris; Automobiles Citroen, Neuilly, both of France

[21] Appl. No.: 127,288

[22] Filed: Dec. 1, 1987

[30] Foreign Application Priority Data

Dec. 4, 1986 [FR] France ............................... 86 17001

[51] Int. Cl.$^4$ ...................... B60G 25/00; B60G 15/00; B60K 5/12; F16F 15/04
[52] U.S. Cl. .................................. 180/291; 180/902; 267/140.1; 267/219; 248/636; 280/668
[58] Field of Search ................. 280/668, 697; 180/902, 180/291, 300, 312; 267/35, 140.1, 219, 220; 248/562, 631, 636

[56] References Cited

U.S. PATENT DOCUMENTS

| | | | |
|---|---|---|---|
| 3,957,128 | 5/1976 | Le Salver et al. | 180/902 |
| 3,958,654 | 5/1976 | Le Salver et al. | 180/902 |
| 4,420,060 | 12/1983 | Kakimoto | 248/631 |
| 4,621,795 | 11/1986 | Eberhard et al. | 248/636 |
| 4,666,016 | 5/1987 | Abe et al. | 180/291 |

FOREIGN PATENT DOCUMENTS

| | | | |
|---|---|---|---|
| 0027751 | 4/1981 | European Pat. Off. | 267/140.1 |
| 0126006 | 11/1984 | European Pat. Off. | |
| 0178934 | 4/1986 | European Pat. Off. | 180/902 |
| 3245653 | 6/1984 | Fed. Rep. of Germany | |
| 2542405 | 9/1984 | France | |
| 188637 | 9/1985 | Japan | 267/140.1 |

Primary Examiner—Charles A. Marmer
Assistant Examiner—Karin L. Ferriter
Attorney, Agent, or Firm—Burns, Doane, Swecker & Mathis

[57] ABSTRACT

A first chamber (18) of variable volume is interposed between the body (20) and the adjacent part of the damper (14) and hydraulically connected to a second chamber (40) of variable volume provided in an elastically yieldable support (24) interposed between the power unit (22) and the body (20) so as to constitute a work chamber. The second chamber (40) is connected to a third chamber (41) of variable volume constituting a simple expansion chamber which is not subjected to exterior forces, through a passageway of great length and small section. The hydraulic connection between the first chamber (18) and at least one of the other two chambers (40), (41) is achieved, at least partly, through the passageway of great length.

9 Claims, 5 Drawing Sheets

SUSPENSION DEVICE FOR THE BODY AND THE POWER UNIT OF A MOTOR VEHICLE

The invention relates to a suspension device for the body and the power unit of a motor vehicle which comprises, in association with each wheel, a telescopic damper connected on one hand to the body and on the other hand to the wheel. A suspension device is known from patent FR-A-No. 2,272,857 which comprises, for each of the wheels, a chamber of variable volume interposed between the body and the adjacent part of the damper, filled with an uncompressible liquid and connected hydraulically to a second chamber of variable volume disposed between the body and the power unit. This second chamber is usually provided inside an elastically yieldable support interposed between the power unit and the body and constitutes a work chamber whose deformable walls are subjected to exterior forces which correspond to the forces created between the engine and the body.

In this known device, the ratio of the forces transmitted by the wheels, on one hand, to the chassis and the body and, on the other hand, to the engine of the vehicle is substantially independent of the frequency of the forces, within the range between 0 and 1.5 FO, FO being the vertical natural frequency of the engine relative to the body.

In the suspension according to the aforementioned patent, the hydraulic connection between the first and second chambers is ensured by a conduit filled with uncompressible liquid. To vary the ratio of the forces transmitted to the chassis and to the engine as a function of the frequency, only one means is available which consists in the utilization of a connecting conduit between the two chambers in respect of which the ratio of the section to the length is sufficiently small. As this possibility of a regulation of the forces transmitted as a function of the frequency is limited to a frequency range in the neighbourhood of the upper limit of the range of utilization of the suspension, it is therefore of no great practical interest.

In the case where several vibratory modes are created by the road between the engine and the body, it is very difficult to achieve a satisfactory design and regulation of the suspension.

Furthermore, the device according to French Pat. No. 2,272,857 does not provide a damping of the movements of the engine with respect to the body. Such vertical movements may be produced, in particular, when the ideal distribution of the forces is hindered by the abutment of the movement limiters associated with the elastically yieldable elements connecting the dampers of the wheel to the body.

An elastically yieldable block is also known from the patent FR-A-No. 2,467,724 which is used in particular for the suspension of an engine of a motor vehicle and comprises two chambers filled with liquid defined by elastically yieldable walls subjected to the exterior forces involved between the engine and the body of the vehicle and interconnected by a conduit of great length providing a certain damping of the movements of the engine with respect to the body. Such a device which is designed quite independently of the suspension of the body relative to the wheels of the vehicle does not provide a solution as concerns the distribution of the forces transmitted by the wheels between the body and the engine.

An object of the invention is therefore to provide a suspension device of the body and the power unit of a motor vehicle comprising, associated with each of at least two wheels, a telescopic damper connected, on one hand, to the body and, on the other hand, to the wheel, and a first chamber having a variable volume interposed between the body and the adjacent part of the damper filled with an uncompressible liquid and hydraulically connected to a second chamber having a variable volume provided in an elastically yieldable support interposed between the power unit and the body, so as to constitute a work chamber whose deformable walls are subjected to the exterior forces, this suspension device permitting the achievement, throughout the range of utilization of the suspension as concerns frequency, an ideal distribution of the forces transmitted by the wheels to the body and to the engine and a damping of the movements of the engine relative to the body, upon the abutment of the wheel's dampers, whereby the comfort of the passengers of the vehicle is considerably improved.

For this purpose, the second chamber is connected to a third chamber having a variable volume constituting a simple expansion chamber whose deformable walls are not subjected to exterior forces, through a passageway of great length and small section, and the hydraulic connection between the first chamber and at least one of the other two chambers is achieved, at least partly, through said passageway of great length.

In order to explain the invention, there will now be described by way of nonlimiting examples, with reference to the accompanying drawings, the general structure and two embodiments of a suspension device according to the invention.

Figure 1:
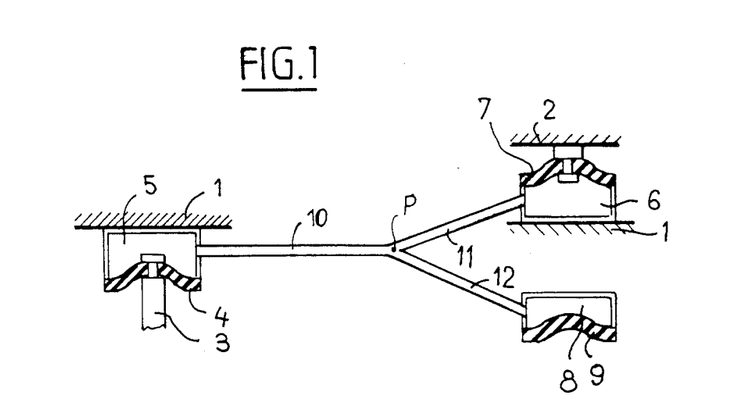
FIG. 1 is a diagrammatic view of the general structure of the device according to the invention.

Diagrammatically shown in FIG. 1 is the part associated with a wheel of the vehicle (not shown), of a suspension device according to the invention and showing the suspension of the body 1 and the power unit 2 of the vehicle. The suspension device comprises a telescopic damper whose body (not shown) is connected to the wheel of the vehicle and whose rod 3 is connected to the deformable wall 4 of a chamber 5 of variable volume, filled with uncompressible fluid and interposed between the body 1 of the vehicle and the damper.

A second chamber 6 of variable volume interposed between the body 1 and the power unit 2, also filled with uncompressible fluid, has a deformable wall 7 connected to the engine 2.

A third chamber 8 of variable volume filled with uncompressible fluid and including a deformable wall 9 is fixed to the vehicle, either through an elastically yieldable support device for the engine incorporating the second chamber 6, or independently. The chamber 3 is a simple expansion chamber whose deformable wall is not subjected to exterior forces, in contrast to the deformable walls of the chambers 5 and 6 which are subjected to the forces involved between the damper rod and the body and between the engine and the body, respectively.

The chambers 5, 6 and 8 are interconnected by conduits 10, 11 and 12 filled with uncompressible fluid. The conduit 10 of length l1 and of section s1 has a junction point P common to the conduit 11 of length l2 and section s2 and to the conduit 12 of length l3 and section s3, the assembly of the conduits 10, 11 and 12 constituting a Y-shaped junction element between the chambers 5, 6 and 8 to which the conduits 10, 11 and 12 are connected.

The work chamber 6 is connected to the expansion chamber 8 through the conduits 11 and 12 arranged one after the other. These two conduits 11 and 12 constitute a passageway of great length relative to its diameter, the length l2 plus l3 being, for example, 10 to 100 times greater than the diameter of the sections s2 and s3 which are equal to each other or only slightly different from each other. The first work chamber 5 is connected to the second chamber through the conduit 10 and the conduit 11 constituting a part of the passageway of great length. This first chamber 5 is connected to the expansion chamber 8 through the common conduit 10 and through the conduit 12 constituting a part of the passageway of great length.

It will be noted that, for carrying out the invention, the length of any one of the conduits 10, 11 and 12 may be zero, but that at least two of these conduits have a length which is not zero. When one of the conduits has zero length, the junction point P is located in the region of one of the chambers 5, 6 and 8, depending on whether the conduit of zero length is the conduit 10, 11 or 12, respectively.

A general description will now be given of the operation of a suspension device such as shown in FIG. 1.

Any impulse coming from an unevenness of the road and transmitted through the wheel and the rod of the corresponding damper is translated into a variation of volume V1 in the chamber 5 and simultaneously by the creation of a force F1 transmitted to the body 1 of the vehicle. This variation of volume causes substantially simultaneous variations of volume V2 and V3 in the chambers 6 and 8, these variations being such that: V1=−(V2+V3), the conduits 10, 11 and 12 being assumed to be undeformable. The variation of volume V2 in the work chamber 6 is accompanied by a force F2 transmitted to the engine 2. The desired objective is to have a ratio F1/F2 which gives, throughout the frequency range corresponding to the use of the vehicle on the road, this frequency range being between 0 and 25 Hertz, the lowest possible level of vibration of the body of the vehicle, in order to obtain the best possible comfort for the passengers.

This may be achieved by the use of a suspension device such as shown in FIG. 1, while suitably choosing the position of the junction point P in the path of the column of liquid hydraulically connecting the chambers 6 and 8 within the passageway of great length 11, 12.

In the vibratory mode of the liquid column oscillating between the chambers 6 and 8, there is a point located between the two ends of the column where the vibratory pressure is 0. This point is in the middle of the column if the deformable walls defining the chambers 6 and 8 have the same characteristics of stiffness.

If the junction point P is coincident with the point where the vibratory pressure is 0 in the liquid column interconnecting the chambers 6 and 8, the pressure impulses resulting from the unevenness of the road and transmitted by the wheels, do not excite the vibratory mode of the liquid column between the chambers 6 and 8, so that the force F2 transmitted to the engine does not vary as a function of the frequency. Shown in FIG. 8 is the corresponding curve a which is in this case a straight line parallel to the axis of the frequencies.

Figure 8:
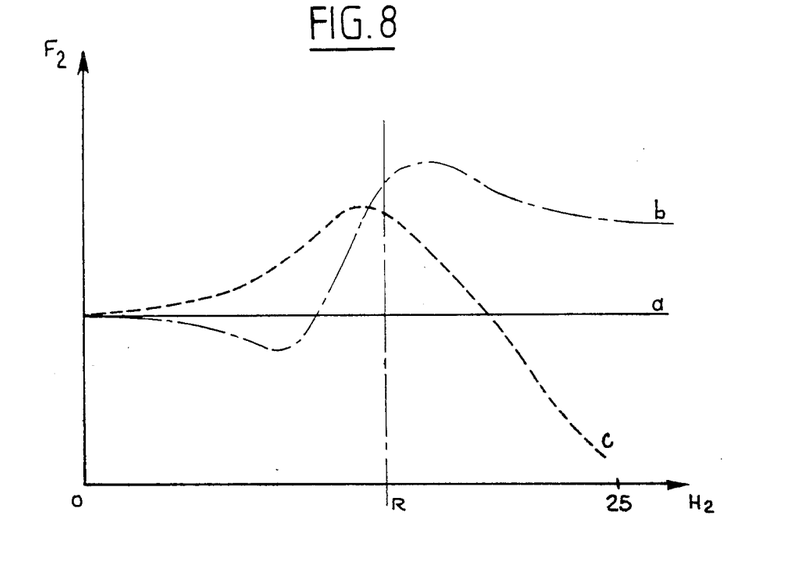
FIG. 8 is a diagram representing the variations in the force transmitted to the engine as a function of the frequency of the stresses, in the case of suspension devices according to the invention which have different characteristics.

Plotted in FIG. 8 in the frequency range 0 to 25 Hz constituting the range of utilization of the suspension, the frequency of resonance R of the liquid column interconnecting the chambers 6 and 8, within the passageway of great length. This frequency R corresponds to the maximum damping of the movements of the engine relative to the body.

If the junction point P is located adjacent to the expansion chamber 8 relative to the point of 0 pressure in the liquid column within the passageway of great length, the liquid column constitutes a screen for the frequencies higher than the frequency of resonance R of the column. Consequently, there is a reduction of the force F2 after the resonance. The corresponding variation of the force F2 transmitted to the engine is represented by the curve c in FIG. 8.

Finally, if the point P is located adjacent to the work chamber 6, relative to the point of 0 pressure in the liquid column, the force F2 is reduced below the frequency of resonance R and increased above. The corresponding variation of the force F2 is represented by the curve b of FIG. 8.

There is consequently made available a possibility of regulating the variations of the force F2 transmitted to the engine as a function of the frequency.

Furthermore, when the level of the impulse coming from the road is very high, the bottoming of the abutments limiting the displacement of the damper, in the region of the chamber 5, causes an increase in the ratio F1/F2 as compared with the desired objective.

In this case, any relative movement of the engine relative to the body of the vehicle causes a flow of liquid between the chambers 6 and 8, since the chamber 5 is substantially blocked by the movement limiters. These movements of the engine relative to the body are then damped owing to the damping forces produced by the flow of the liquid column in the passageway of great length.

Figure 2:
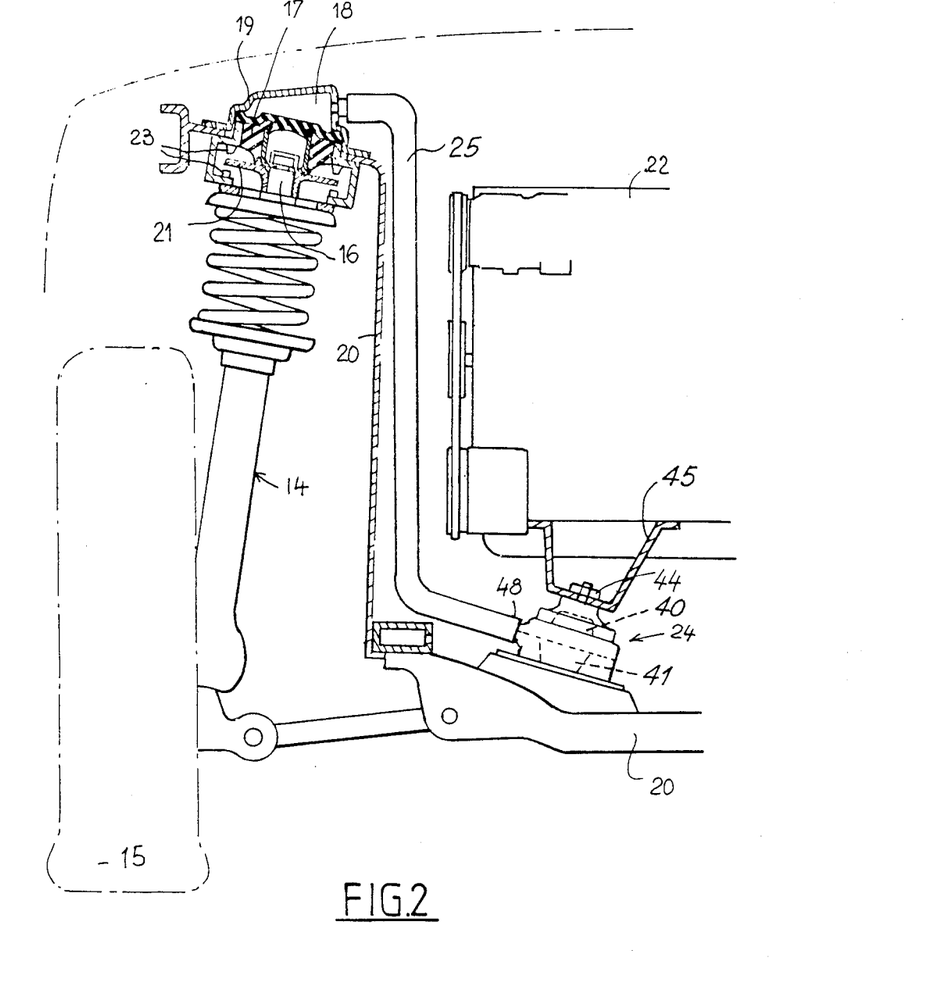
FIG. 2 is an elevational view, partly in section, of a first embodiment of a suspension device according to the invention associated with a wheel of a motor vehicle.
Figure 3:
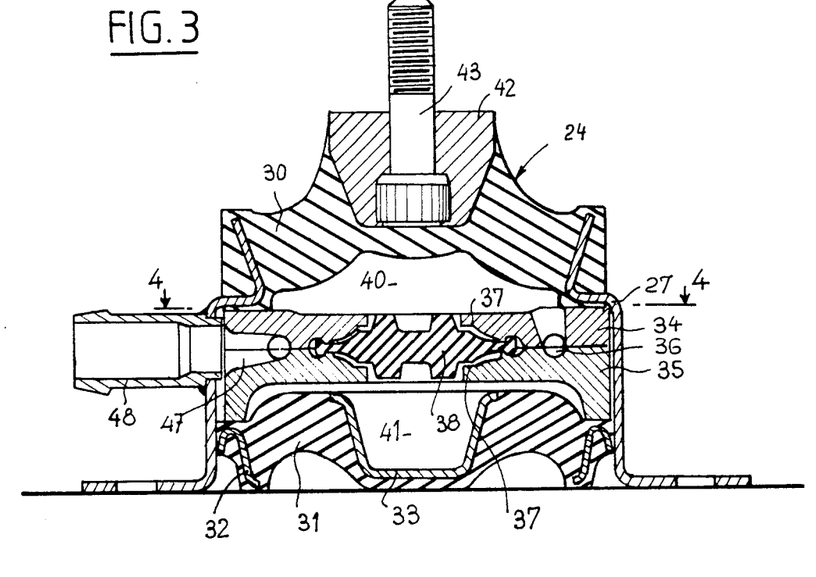
FIG. 3 is an enlarged sectional view of the elastically yieldable support of the suspension shown in FIG. 2, interposed between the engine and the body.
Figure 4:
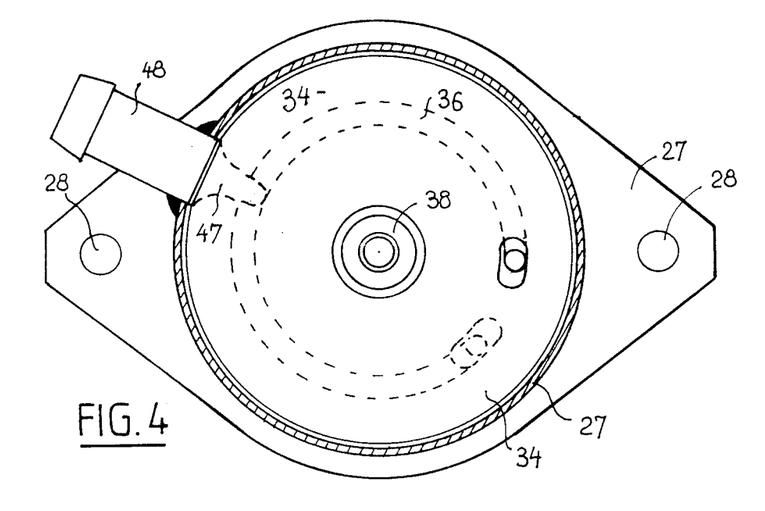
FIG. 4 is a sectional view taken on line 4—4 of FIG. 3.

FIGS. 2, 3 and 4 show a first embodiment of the suspension device according to the invention which comprises a telescopic damper 14 whose body is connected to the wheel 15 of the vehicle and whose rod 16 is connected to an elastically yieldable wall 17 constituting the deformable lower wall of a chamber 18 including a rigid wall 19 fixed to the body 20 of the vehicle. The chamber 18 filled with liquid is thus interposed between the body 20 of the vehicle and the end of the rod 16 of the telescopic damper. This end of the rod 16 is rigid with a flange 21 movable with the rod of the damper between movement limiting stops 23 mounted on the body 20.

An elastically yieldable support 24 which will be described in detail with reference to FIGS. 3 and 4, is moreover interposed between the power unit 22 of the vehicle and the chassis connected to the body 20. A hydraulic connection conduit 25 enables the chamber 18 interposed between the damper and the body to be connected to the chambers of the elastically yieldable support 24 in a manner which will be described with reference to FIGS. 3 and 4.

As can be seen in these figures, the elastically yieldable support 24 comprises a metal frame 27 provided with apertures 28 for fixing it to the body 20 of the vehicle, and an elastically yieldable wall 30 of elastomer which is connected by adherence of the upper part of the frame 27 to its peripheral part. A second wall 31 of elastomer reinforced by metal frames 32 and 33 is fixed at its periphery to the lower part of the frame 27 of the elastically yieldable support. Two circular rigid disks 34 and 35 are mounted between the elastically yieldable walls 30 and 31, clamped one against the other, and maintained in this position after assembly owing to the rigidity of the frames.

The disks 34 and 35 are shaped on their confronting sides to constitute, by their assembly, a passageway 36 which is of great length relative to its section, has a circular shape and opens at one of its ends onto the upper side of the upper disk 34 and, at its other end, onto the lower side of the lower disk 35. The two disks 34 and 35 are also shaped to constitute bearing seats 37 for a movable wall 38 of elastomer interposed between the disks 34 and 35 in their center part.

This arrangement is in accordance with the teaching of patent FR-A-No. 2,467,724 which relates to an elastically yieldable support which provides both a good filtration of the vibrations of high frequency and low amplitude produced by a vehicle engine and a damping of vibrations of low frequency and large amplitude between the engine and the body of the vehicle. The movable and deformable wall 38 placed between the two disks 34 and 35 and permitting the filtering of the vibrations of small amplitude and high frequency is, however not indispensable for the realization of the present invention.

The wall constituted by the two disks 34 and 35, completed by the central movable wall 38, defines a chamber 40 between the deformable wall 30 and the upper surface of the separation wall and a second chamber 41 between the lower deformable wall 31 and the lower surface of the separation wall. The deformable upper wall 30 of the elastically yieldable support is connected to a connection member 42 in which is fixed a bolt 43 which may be engaged in an aperture provided in a foot 45 connected to the power unit 22 of the vehicle as can be seen in FIG. 2.

The elastically yieldable support is fixed to the engine by a nut 44 cooperating with the bolt 43. The deformable wall 30 carries the exterior forces which correspond to the forces involved between the power unit 22 and the body 20 of the vehicle. The chamber 40 defined by this wall 30 above the disk 34 therefore constitutes a work chamber, on the other hand, the wall 31 which is not connected to the frame 27 is subjected to no exterior force and constitutes a simple expansion chamber. The two chambers 40 and 41 are connected through the passageway 36 of great length which opens onto the sides of the disks 34 and 35 defining the chambers 40 and 41 respectively.

The disks 34 and 35 are also shaped to constitute by their juxtaposition a radially extending passageway 47 connecting the passageway 36 to a peripheral region of the disks 34 and 35 having a small recess in the radial direction between two generatrices, for the engagement of an end member 48 which is thus put in communication with the passageway 47 and the passageway 36. The end member 48 is welded to the metal frame 27 of the elastically yieldable support and receives the end of the conduit 25 ensuring the hydraulic connection between the chamber 18 located at the end of the damper 14 and the conduits communicating with the chambers 40 and 41 of the elastically yieldable support 24. Further, the end member 48 introduced into the radial recess machined on the periphery of the disks 34 and 35 enables these disks to be fixed in angular position with respect to each other.

The assembly constituted by the chambers 18, 40 and 41 and the conduits connecting these chambers 25, 47 and 36 is filled with an uncompressible liquid and operates in the same way as the suspension device diagrammatically represented in FIG. 1 and described hereinbefore. The chambers 18, 40 and 41 of the device shown in FIGS. 2, 3 and 4 are equivalent to the chambers 5, 6 and 8 of the device shown in FIG. 1 respectively. The conduit 25 and passageway 47 in the extension of this conduit correspond to the conduit 10, the point of intersection between the passageway 47 and the passageway 36 of great length corresponding to the connection point P. The two portions of the passageway 36 located on each side of the passageway 47 and opening onto the chambers 40 and 41 respectively are similar to the conduits 11 and 12 of the device shown in FIG. 1.

In the described and illustrated embodiment, the passageway 47 of the connection between the passageway 36 and the conduit 25 is in a position located at equal distances from the ends of the passageway 36 opening onto the chambers 40 and 41 respectively. In the case where the deformable walls 30 and 31 have the same stiffness, the point of 0 pressure in the liquid column filling the passageway 36 corresponds to the point of intersection between the passageway 47 and the passageway 36. The force transmitted to the engine in the case of an impulse resulting from an unevenness of the road does not depend on the frequency and may be represented by the curve a of FIG. 8. The device then has the advantage of damping the movements of the engine relative to the body of the vehicle when the rod of the damper and the deformable wall 17 of the chamber 18 are blocked by the stops 23.

To obtain a variation of the force transmitted to the engine as a function of the frequency, which is of the type represented by the curve b or c of FIG. 8, it is sufficient to provide a passageway 47 of communication between the conduit 25 and the passageway 36 placed in a position which is closer to one or the other of the ends of the passageway 36.

In the case where the deformable walls 30 and 31 of the chambers 4 and 41 respectively do not have an identical stiffness, it is possible to obtain a transmitted force-frequency characteristic of the type b or c with an arrangement such as shown in FIG. 4 where the passageway 47 opens onto the median part of the passageway 36.

Furthermore, the level of the forces transmitted to the engine depends on the stiffness of the deformable walls of the chambers.

Consequently, the required means are available in all cases for regulating the force transmitted to the engine and its variation as a function of the frequency, for limiting the level of the vibrations of the vehicle within the entire frequency range of utilization.

Figure 5:
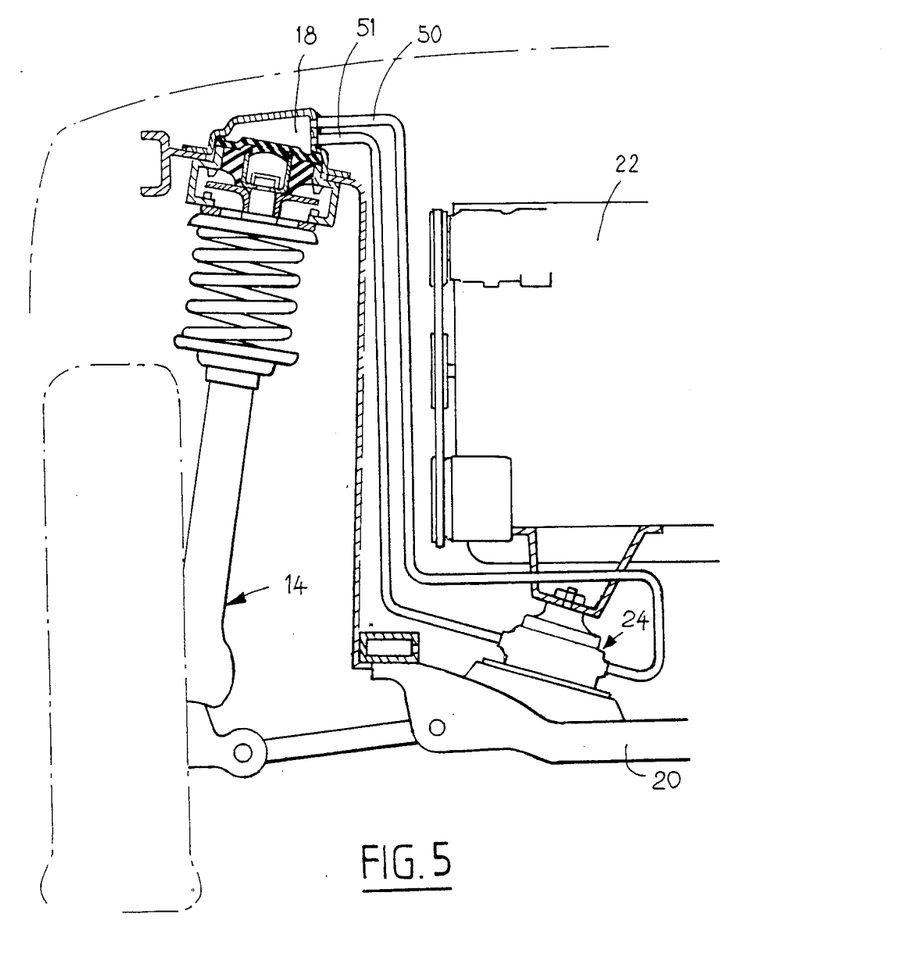
FIG. 5 is an elevational view, partly in section, of a second embodiment of a suspension device according to the invention associated with a wheel of a motor vehicle.
Figure 6:
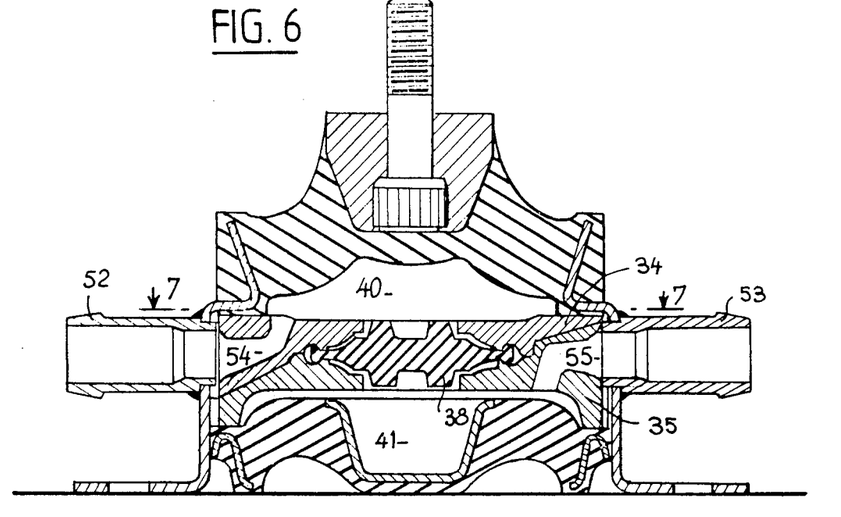
FIG. 6 is an enlarged sectional view of the elastically yieldable support of the suspension device shown in FIG. 5, interposed between the engine and the body.
Figure 7:
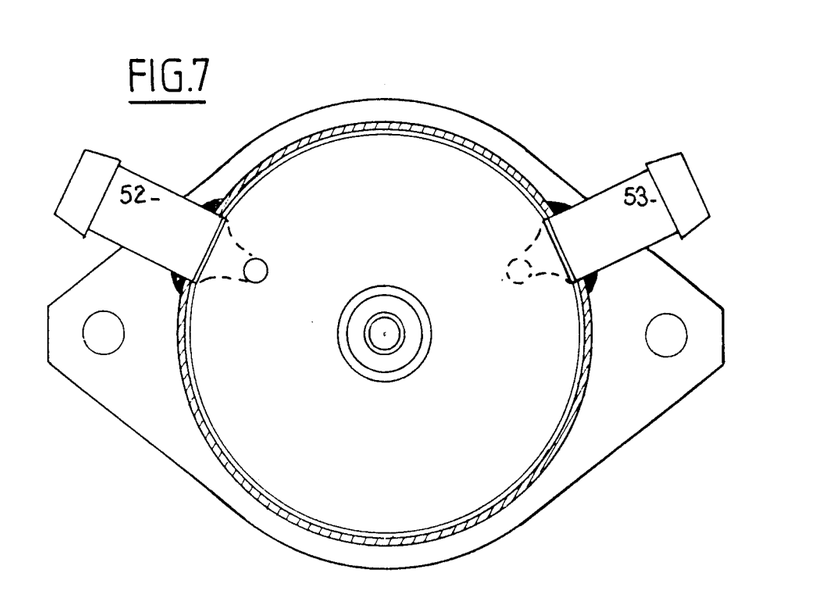
FIG. 7 is a sectional view taken on line 7—7 of FIG. 6.

FIGS. 5, 6 and 7 show a second embodiment of the suspension device according to the invention. The corresponding elements in FIGS. 5, 6 and 7 on one hand and 2, 3 and 4 on the other carry the same reference numerals.

As can be seen in FIG. 5, the chamber 18 above the damper 14 is connected to the elastically yieldable support 24 interposed between the engine 22 and the body 20 through two conduits 50 and 51.

The conduit 50 is connected to the elastically yieldable support 24 through a terminal 52 and the conduit 51 through a terminal 53.

It can be seen that the two disks 34 and 35 constituting with the movable wall 38 a separation wall between the chambers 40 and 41 are provided with passageways 54 and 55 opening onto the chambers 40 and 41 respectively. The terminal 52 is fixed to the frame 27 and the disk 34 is angularly positioned with respect to the frame 27 in such manner that the passageway 34 is in the extension of the terminal 52. The chamber 40 is thus put into communication with the chamber 18 through the conduit 50.

In the same way, the terminal 53 and the passageway 55 are put into communication with each other and the chamber 41 is put into communication with the chamber 18 through the conduit 51.

By comparison with the device generally described with reference with FIG. 1, it can be seen that, in this embodiment, the conduit 10 has zero length, the point of connection P being located in the region of the chamber 18 and the passageway of great length interconnecting the chambers 40 and 41 being constituted by the whole of the conduits 50 and 51 outside the elastically yieldable support 24.

The chambers 18, 40 and 41 and the conduits 50 and 51 are filled with uncompressible fluid and the operation of the suspension device depends on the position of the point of zero dynamic pressure in the passageway interconnecting the chambers 40 and 41 relative to the chamber 18. If this point of zero dynamic pressure is in the chamber 18, the curve a of FIG. 8 is again applicable. If this point is on the conduit 50, the operation according to curve c again applies and, lastly, if this point is on the conduit 51, the operation according to curve b again applies.

When the level of excitation due to the road is very high, the relative movement of the engine relative to the body causes a flow of liquid between the chambers 40 and 41 through the conduits 50 and 51. This flow produces damping forces, the two conduits in series 50 and 51 constituting a passageway of great length interconnecting the two chambers.

This embodiment affords, relative to the embodiment described with reference to FIGS. 2, 3 and 4, the following advantages:

the passageway of great length interconnecting the two chambers is located outside the elastically yieldable support so that its length and its diameter are not limited by the geometric characteristics of the support:

the use of two connection conduits 50 and 51 enables them to be constructed in the form of pipes of smaller diameter which are easier to shape.

The invention is not intended to be limited to the described embodiments.

Thus, in the case where the second work chamber and the expansion chamber are formed within an elastically yieldable support interposed between the engine and the chassis, the separation wall between these two chambers, within the support, may be constructed in a completely rigid form instead of having a deformable part.

The expansion chamber may be constructed independently of the elastically yieldable support interposed between the engine and the body and located in any region of the vehicle.

In the case of an embodiment having two conduits connecting the first chamber to the second and third chambers respectively, a common section between the first chamber and a connection point common to the two conduits may be used.

It will be clear that the suspension device according to the invention is applicable to any vehicle having, for each of its wheels, a telescopic damper interposed between the wheel and the body. The device may comprise an assembly such as that described associated with each of the wheels in a completely independent manner or, on the contrary, in association with at least one other similar assembly.

What is claimed is:

1. Suspension device for the body and the power unit of a motor vehicle having wheels, said device comprising, associated with each of at least two wheels, a telescopic damper having one end connected to the body and opposite end connected to the wheel, and a first chamber of variable volume, which is interposed between the body and adjacent part of the damper, filled with an uncompressible liquid, a second chamber hydraulically connected to the first chamber and of variable volume, an elastically yieldable support containing the second chamber and interposed between the power unit and the body so as to constitute a work chamber having a deformable wall which is subjected to exterior forces, a third chamber of variable volume constituting a single expansion chamber having a deformable wall which is not subjected to exterior forces, and a passageway of great length and small cross section for connecting the second chamber to the third chamber, a hydraulic connection between the first chamber and said passageway of great length so that there is fluid communication between said first chamber and at least one of the other two chambers, at least partly, through said passageway of great length.

2. Suspension device according to claim 1, wherein the second chamber and the third chamber are both provided inside the elastically yieldable support and an at least partly rigid partition wall separates the second and third chamber.

3. Suspension device according to claim 2, wherein the passageway of great length is provided within the separation partition wall, and a passageway provided in the radial direction within the separation partition wall puts the passageway of great length in communication with a terminal connected to a frame of the elastically yieldable support for the hydraulic connection of the second and third chambers with the first chamber through a conduit connected at an end thereof to said terminal and at least a part of the passageway of great length.

4. Suspension device according to claim 2, wherein the separation wall between the second chamber and the third chamber is of circular shape and constituted by two rigid disks clamped against each other between which is interposed, in a centre part thereof, a deformable movable wall of circular shape.

5. Suspension device according to claim 4, wherein at least one terminal is fixed to the elastically yieldable support and the disks include a radically extending recess at their periphery for their engagement on said terminal providing a hydraulic connection of said terminal with the second and third chambers and an angular positioning of the two disks relatively to each other.

6. Suspension device according to claim 1, wherein a first conduit connects the first chamber independently to the second chamber and a second conduit connects the first chamber to the third chamber.

7. Suspension device according to claim 1 wherein the passageway of great length has ends and a location between said ends where the vibratory pressure is essentially zero, and wherein the hydraulic connection with the first chamber communicates with the said passageway at said location.

8. Suspension device for a motor vehicle having a body, a power unit, a wheel and a vibration damping device connected between the body and the wheel comprising:

a first variable volume chamber means for connection between the vibration damping device and the body and filled with an incompressible fluid;

a second variable volume chamber means for connection between the power unit and the body and filled with an incompressible fluid;

a third variable volume chamber means filled with an incompressible fluid and having a deformable wall;

a passageway connecting the second variable volume chamber means the third variable volume chamber means, having a pair of ends and a length which greatly exceeds the characteristic cross-sectional dimension of the passageway; and means for hydraulically connecting the first variable volume chamber means with the passageway between the ends thereof.

9. The suspension device of claim 8 wherein:

said passageway includes a location between said ends where the vibratory pressure is essentially zero, and the means for hydraulically connecting the first variable volume chamber means is connected to said passageway at said location.

* * * * *